US012044041B2

(12) United States Patent
Yang

(10) Patent No.: US 12,044,041 B2
(45) Date of Patent: Jul. 23, 2024

(54) UNIVERSAL SECURITY LOCK FOR PORTABLE ELECTRONIC DEVICES

(71) Applicant: JIN TAY INDUSTRIES CO., LTD., New Taipei (TW)

(72) Inventor: Kuo-Tsung Yang, Taipei (TW)

(73) Assignee: JIN TAY INDUSTRIES CO., LTD., New Taipei (TW)

( * ) Notice: Subject to any disclaimer, the term of this patent is extended or adjusted under 35 U.S.C. 154(b) by 349 days.

(21) Appl. No.: 17/519,469

(22) Filed: Nov. 4, 2021

(65) Prior Publication Data

US 2023/0133788 A1 May 4, 2023

(51) Int. Cl.
*E05B 73/00* (2006.01)

(52) U.S. Cl.
CPC ...... *E05B 73/0082* (2013.01); *E05B 73/0005* (2013.01)

(58) Field of Classification Search
CPC .. E05B 73/00; E05B 73/0005; E05B 73/0082; Y10T 70/50; Y10T 70/5009; Y10T 70/40
USPC .................................................. 70/14, 57, 58
See application file for complete search history.

(56) References Cited

U.S. PATENT DOCUMENTS 10,400,482 B2* 9/2019 Kao .................... E05B 73/0082
11,035,152 B2* 6/2021 Avganim ............ E05B 73/0082
2008/0053168 A1* 3/2008 Lu ....................... E05B 73/0082 70/58
2014/0090428 A1* 4/2014 Yang ................... E05B 73/0082 70/15
2015/0059422 A1* 3/2015 Kao .................... E05B 73/0005 70/58
2016/0281389 A1 9/2016 Chow
2020/0080346 A1* 3/2020 Wu ..................... E05B 73/0082
2022/0205283 A1* 6/2022 Yang ................... E05B 73/0082
2023/0135591 A1* 5/2023 Yang ................... E05B 73/0082 70/51
2023/0139662 A1* 5/2023 Yang ................... E05B 73/0005 70/58

FOREIGN PATENT DOCUMENTS

TW 392753 6/2000
TW 413259 11/2000
TW 467185 12/2001
(Continued)

*Primary Examiner* — Suzanne L Barrett
(74) *Attorney, Agent, or Firm* — Sinorica International Patent & Trademark

(57) ABSTRACT

A universal security lock for portable electronic devices has a lock case and a lock core. The lock core, a displacement absorber, an expanding rod, and two gripping fingers are arranged in a passage of the lock case. An operating part of the lock core is movable inwardly into the passage to an engaged position. The displacement absorber is a spring or two mutually repelling magnets that drive the operating part and the expanding rod to move away from each other. The two gripping fingers are pivotally mounted on a front opening of the lock case. When the operating part is in the engaged position, the displacement absorber pushes the expanding rod toward the front opening to move the outer ends of the two gripping fingers away from each other gradually such that the gripping fingers engage with security slots of different widths.

16 Claims, 12 Drawing Sheets

(56) References Cited

FOREIGN PATENT DOCUMENTS

| | | |
|---|---|---|
| TW | M401684 | 4/2011 |
| TW | I462681 B | 11/2014 |
| TW | M583478 | 9/2019 |
| TW | I737524 B | 8/2021 |

* cited by examiner

UNIVERSAL SECURITY LOCK FOR PORTABLE ELECTRONIC DEVICES

BACKGROUND OF THE INVENTION

1. Field of the Invention

The present invention relates to a security lock, especially to a security lock that is configured to secure portable electronic devices.

2. Description of the Prior Arts

A portable device, such as a laptop, often has a security slot formed in its case such that a specialized security lock can be used for securing the portable device to a permanent object, such as a table or a display case. The security lock prevents the portable device from theft when displayed in showrooms or when temporarily left unattended in public areas such as a library.

The security slot is a hole formed through an exterior wall of the case of the portable device. An end of the security lock is fastened to the permanent object. An expandable gripper is mounted on another end of the security lock. The expandable gripper is configured to be mounted through the security slot and then expanded inside the case such that the gripper is engaged in the security slot to prevent the gripper from being pulled out. As a result, the portable device can be fastened to the permanent object using the security lock.

The security slot has a variety of specifications, and each of the specifications features a unique opening width; meanwhile, thickness of the exterior wall of the case varies from one portable device to another portable device. However, the expandable gripper of the conventional security lock can only be expanded to a specific opened position; that is, the expandable gripper can only expand to a specific width. As a result, each security lock is compatible only with a specific type of security slot, which causes inconvenience to a user and increases cost. For example, each time the user purchases a new laptop with a different security slot, a new security lock has to be prepared. When laptops of different security slots are displayed in the showroom, security locks of different specifications have to be prepared, which is troublesome and costly.

To be more specific, there are three major security slot systems, which are Kensington Slot™, Noble Wedge Slot™, and Kensington Nano Slot™. The Kensington Slot™ has standard rectangular slots, and has introduced oblong slots recently. The Noble Wedge Slot™ has wedge holes, and has introduced 3 mm by 5 mm rectangular hole recently for DELL™ laptops as well as other laptops. As a result, there are totally six different kinds of security slots from the three major systems.

Moreover, among security slots of the same kind, the security slot in one laptop may differ from the security slot in another laptop when said two laptops are of different brands. For example, thickness of a metal plate where the security slot is formed may vary, thickness of the laptop case may vary, and assembly position of said metal plate on the laptop case may vary. As a result, one security lock cannot be employed universally for different kinds of security slots.

To overcome the shortcomings, the present invention provides a universal security lock for portable electronic devices to mitigate or obviate the aforementioned problems.

SUMMARY OF THE INVENTION

The main objective of the present invention is to provide a universal security lock for portable electronic devices that is compatible to different types of security slots for ease of use and cost reduction.

The universal security lock for the portable electronic devices has a lock case, a lock core, a displacement absorber, an expanding rod, and two gripping fingers. The lock case has a passage formed therein. The passage forms a front opening and a rear opening. The front opening and the rear opening are each disposed on a respective one of two opposite ends of the lock case. The lock core, the displacement absorber, the expanding rod, and the two gripping fingers are disposed in the passage of the lock case and arranged in a direction from the rear opening to the front opening. The lock core is mounted to the rear opening and has an operating part movably mounted through the rear opening. The operating part is movable inwardly into the passage to an engaged position. The expanding rod is slidably disposed in the passage. An end, which is toward the front opening, of the expanding rod is defined as an abutting end. The displacement absorber drives the operating part and the expanding rod such that the operating part and the expanding rod tend to move away from each other. Each of the gripping fingers has an inner end, an outer end, an inner surface, an outer surface and an electronic-device-engaging portion. The inner end is located in the passage and is pivotal relative to the lock case. Each of the two inner ends of the two gripping fingers is disposed on a respective one of two opposite sides of the expanding rod. The outer end protrudes from the lock case. The inner surface faces toward another one of the gripping fingers. The outer surface is opposite to the inner surface. The electronic-device-engaging portion protrudes from the outer surface and disposed on the outer end. When the expanding rod is moved toward the front opening, the abutting end of the expanding rod abuts against the two inner surfaces of the two gripping fingers and drives the two electronic-device-engaging portions to move away from each other gradually. When the operating part of the lock core is in the engaged position, the operating part pushes the displacement absorber, making the displacement absorber push the expanding rod toward the front opening such that the two electronic-device-engaging portions of the two gripping fingers are driven to move away from each other.

The displacement absorber has a spring or two magnets that repel each other. To engage the universal security lock with an electronic device, first pivot the two gripping fingers toward each other such that the two electronic-device-engaging portions of the two gripping fingers are closely adjacent to each other. Then, insert the two electronic-device-engaging portions into a security slot of the electronic device, and then press the operating part of the lock core to move the operating part to the engaged position. In the engaged position, the operating part drives the expanding rod via the displacement absorber to move the two electronic-device-engaging portions away from each other to prevent the two gripping fingers from being pulled out from the security slot.

To disengage the universal security lock from the electronic device, operate the lock core to move the operating part away from the engaged position to reduce driving force of the displacement absorber. As a result, the two electronic-device-engaging portions are able to move toward each other, allowing the two gripping fingers to be pulled out from the security slot.

The advantage of the present invention is that the operating part of the lock core drives the expanding rod via the displacement absorber, and movement of the expanding rod gradually expands the two electronic-device-engaging portions; that is, the two electronic-device-engaging portions are moved away gradually by the movement of the expanding rod. As a result, when the operating part is moved to the engaged position, the displacement absorber continuously pushes the expanding rod toward the front opening and forces the two electronic-device-engaging portions to expand until the two gripping fingers are stopped by width of the security slot. Therefore, the present invention is compatible with security slots of different widths and can be adjusted in a stepless manner.

In other words, when the operating part is moved to the same engaged position, the two gripping fingers can be expanded to multiple different expanded positions, unlike conventional security lock that can only be expanded to a single expanded position. As a result, the present invention is compatible with security slots of different widths.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
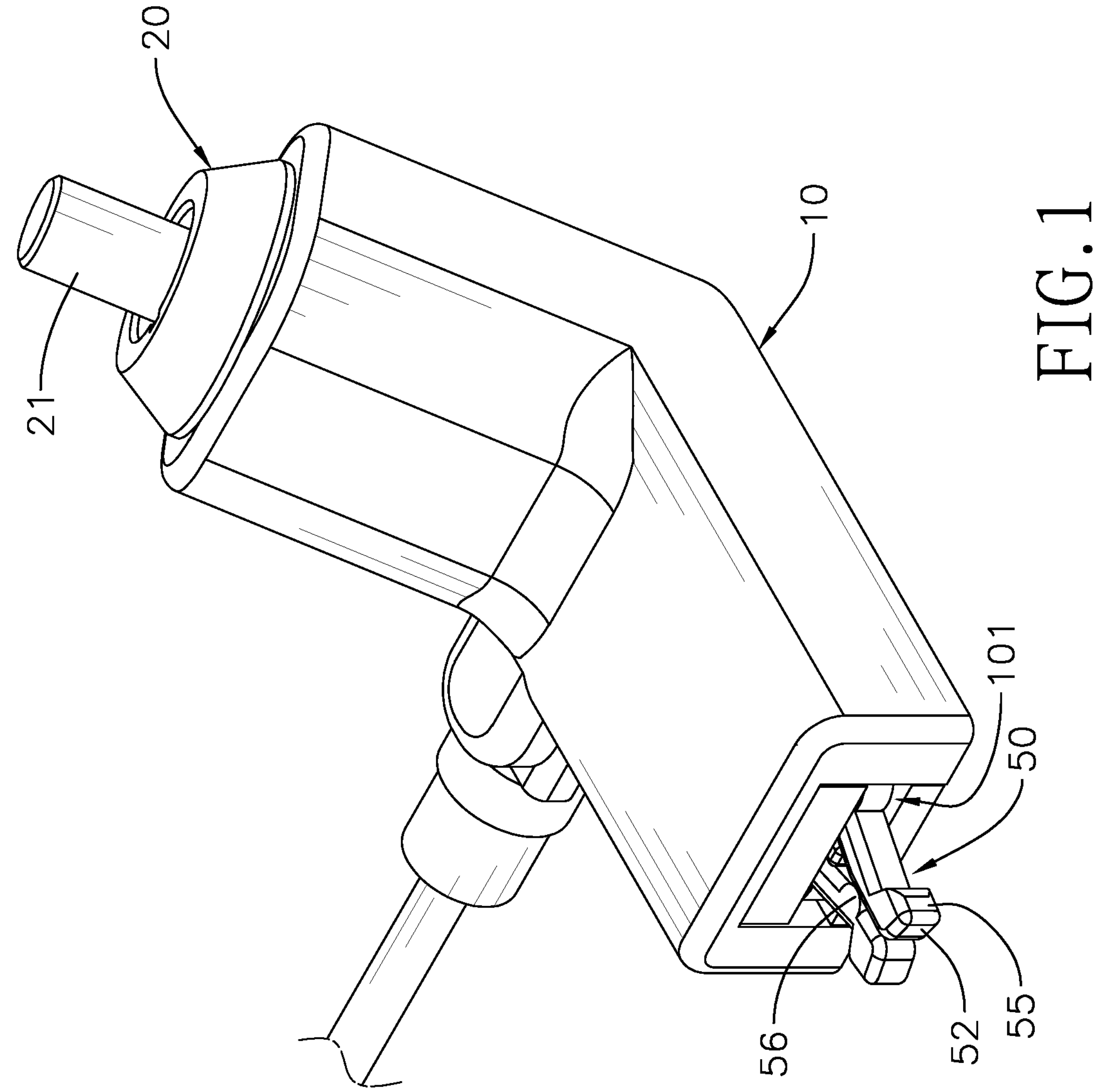
FIG. 1 is a perspective view of a first embodiment of a universal security lock for portable electronic devices in accordance with the present invention.
Figure 2:
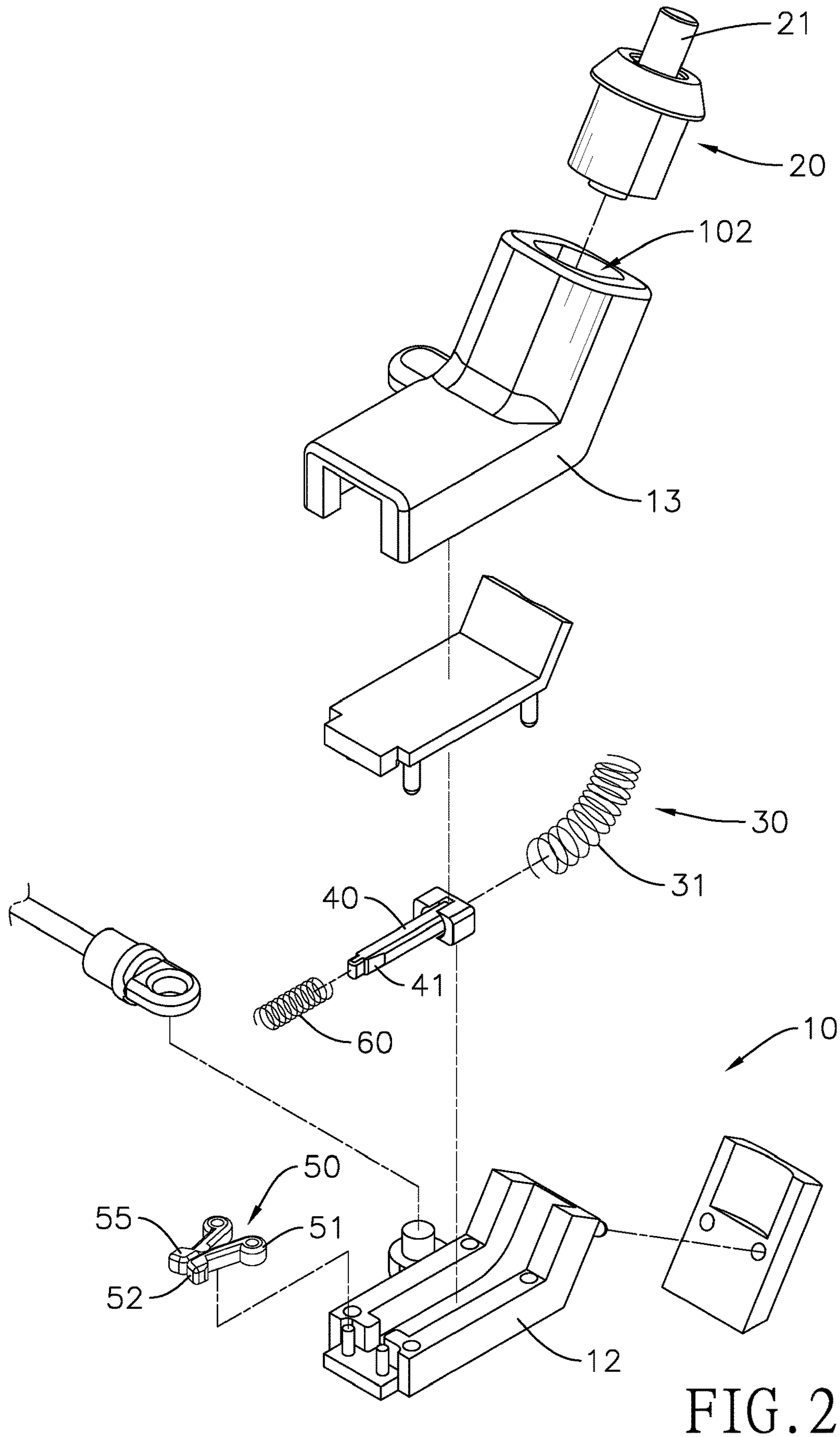
FIG. 2 is an exploded view of the universal security lock in FIG. 1.

With reference to FIGS. 1 to 3 and 6, a universal security lock for portable electronic devices in accordance with the present invention is configured to engage with a security slot 91 of a portable electronic device. The universal security lock comprises a lock case 10, a lock core 20, a displacement absorber 30, an expanding rod 40, and two gripping fingers 50. In the preferred embodiment, the universal security lock further comprises a returning resilient element 60.

Figure 3:
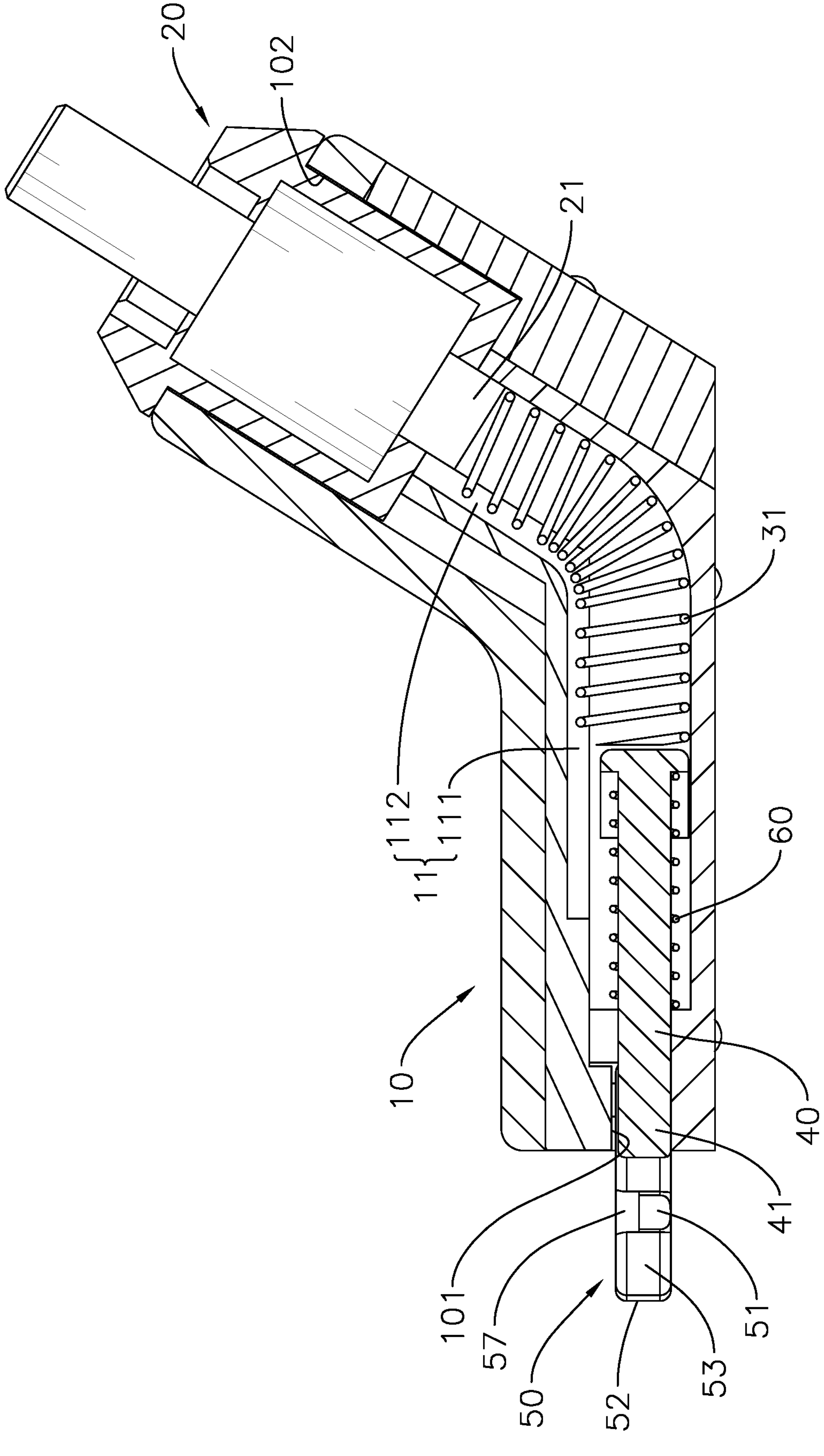
FIGS. 3 and 4 are longitudinal sectional views of the universal security lock in FIG. 1, showing an operating part of a lock core moved from a disengaged position to an engaged position.

The lock case 10 has a passage 11 (as shown in FIG. 3) formed therein. The passage 11 forms a front opening 101 and a rear opening 102. The front opening 101 and the rear opening 102 are each disposed on a respective one of two opposite ends of the lock case 10.

The lock core 20, the displacement absorber 30, the expanding rod 40, and the two gripping fingers 50 are disposed in the passage 11 of the lock case 10 and arranged in a direction from the rear opening 102 to the front opening 101. To be precise, a lower seat 12 and an upper cover 13 are assembled together to form the lock case 10, and the passage 11 is substantially formed by an elongated slot on the lower seat 12.

In the preferred embodiment, the passage 11 is bent; that is, the passage 11 has a front section 111 and a rear section 112, and an extending direction of the front section 111 is nonparallel to an extending direction of the rear section 112. An end of the front section 111 forms the front opening 101. The expanding rod 40 and the two gripping fingers 50 are disposed in the front section 111. An end of the rear section 112 forms the rear opening 102, and the lock core 20 is disposed in the rear section 112. An end of the displacement absorber 30 is disposed in the rear section 112, and another end of the displacement absorber 30 is disposed in the front section 111.

Figure 4:
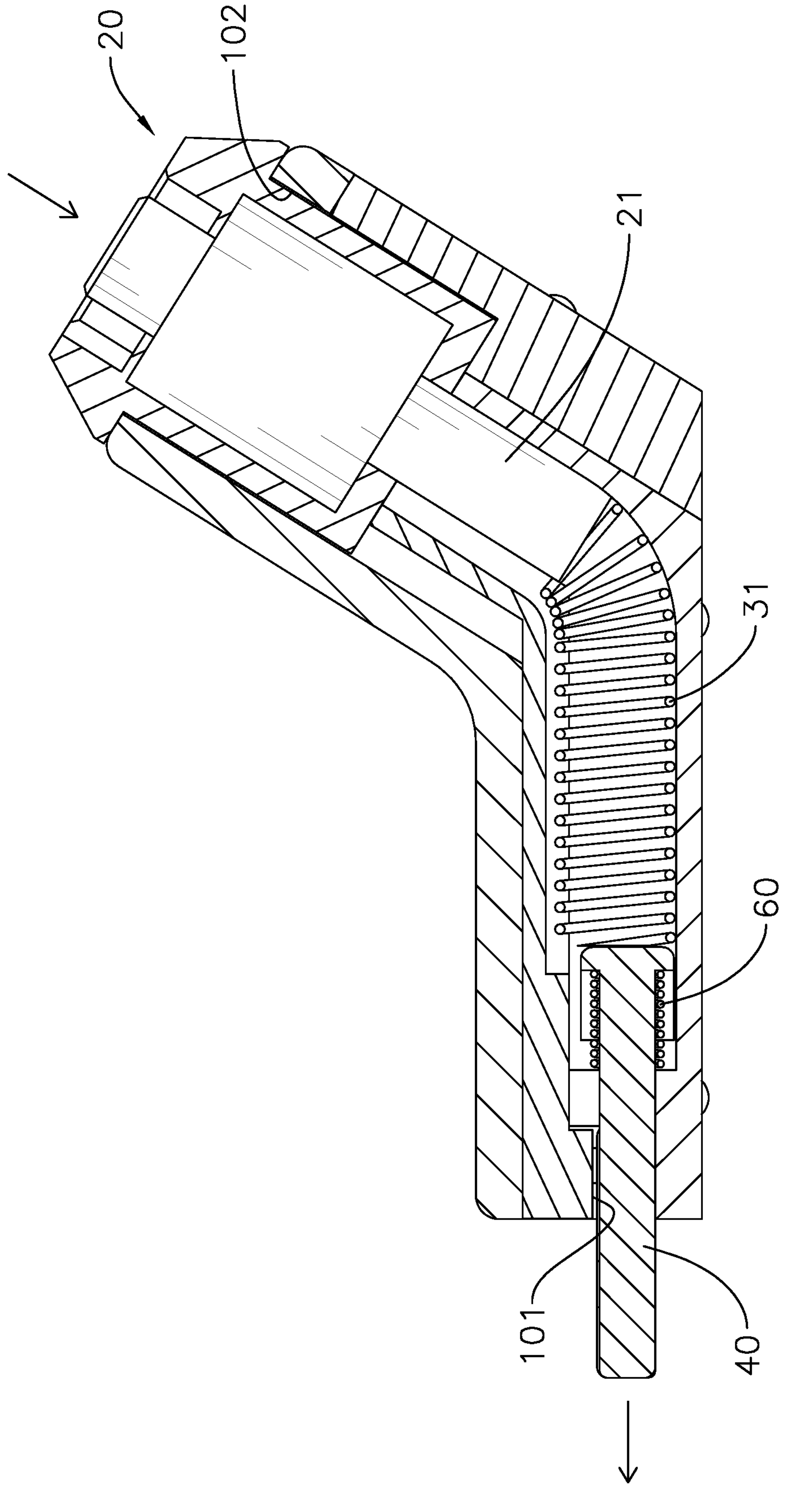
Figure 5:
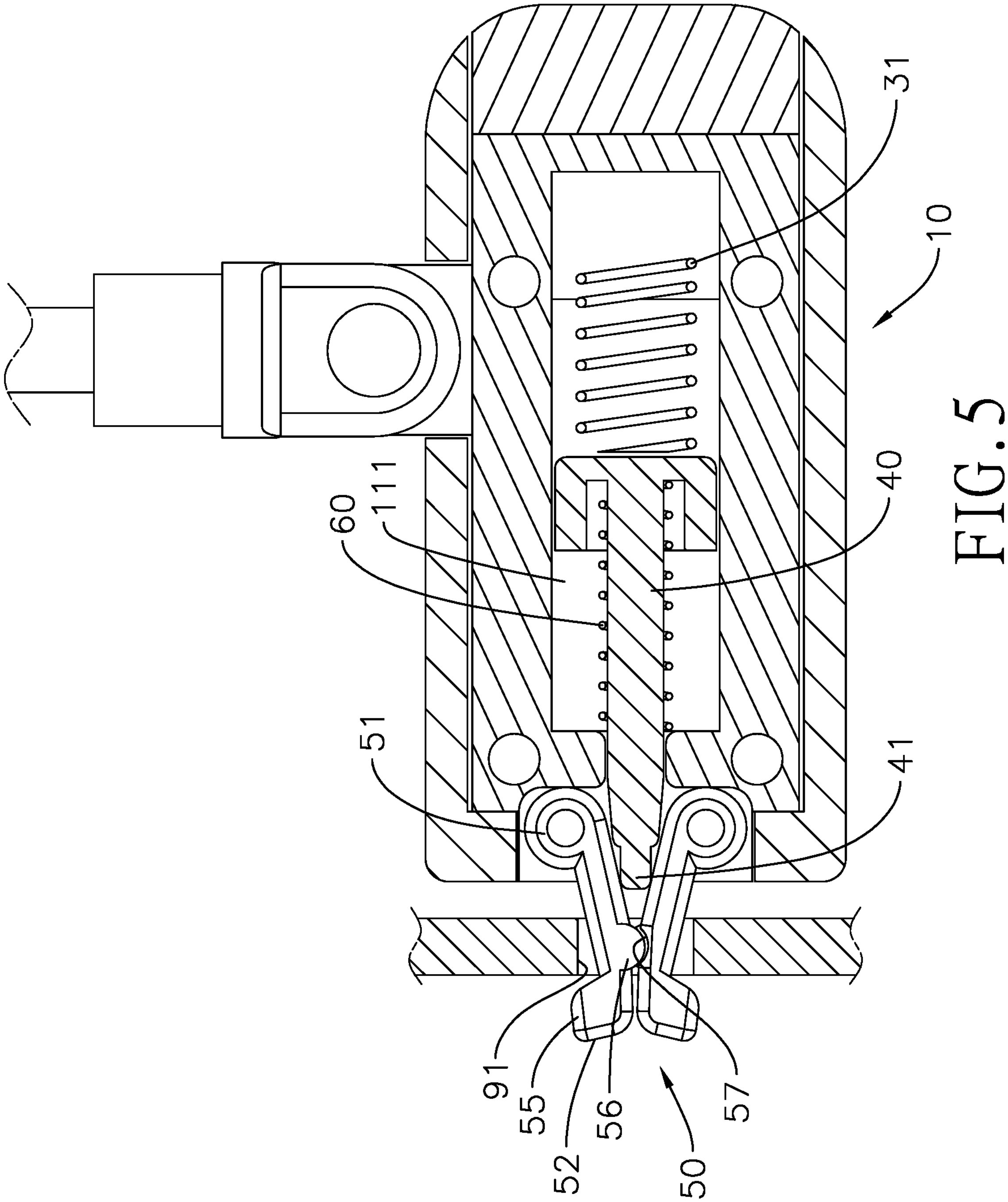
FIG. 5 is an operational cross sectional view of the universal security lock in FIG. 1, showing that when the operating part is in the disengaged position, two gripping fingers are not expanded by an expanding rod yet, and the expanding rod is driven to move away from a front opening by a returning resilient element.

With reference to FIGS. 3 to 5, the lock core 20 is mounted to the rear opening 102 and has an operating part 21 movably mounted through the rear opening 102. The operating part 21 is movable inwardly into the passage to an engaged position (as shown in FIG. 4). The lock core 20 is a conventional standard lock core, and is preferably a standard push lock; therefore, detailed description of the lock core 20 is omitted.

When the operating part 21 of the lock core 20 is in a disengaged position (as shown in FIG. 3), a user may press the operating part 21 to make the operating part 21 move inwardly into the passage 11 to the engaged position. When the operating part 21 is moved to the engaged position, mechanism inside the lock core 20 automatically fixes the operating part 21 in the engaged position. A key (not shown in figures) has to be inserted into the lock core 20 to return the operating part 21 from the engaged position to the disengaged position.

The expanding rod 40 is slidably disposed in the passage 11. An end, which is toward the front opening 101, of the expanding rod 40 is defined as an abutting end 41. A width of the abutting end 41 increases toward the rear opening 102; that is, the width of the abutting end 41 increases toward the displacement absorber 30, but the abutting end 41 is not limited thereto.

The displacement absorber 30 drives the operating part 21 of the lock core 20 and the expanding rod 40 such that the operating part 21 and the expanding rod 40 tend to move away from each other. As a result, when the operating part 21 is in the engaged position, the displacement absorber 30 is capable of absorbing displacement of the expanding rod 40 relative to the operating part 21 such that the expanding rod 40 is constantly pushed toward the front opening 101.

In the preferred embodiment, the displacement absorber 30 has a resilient element 31; when the operating part 21 of the lock core 20 is in the engaged position, resiliency of the resilient element 31 drives the expanding rod 40 to move away from the operating part 21. To be precise, two opposite ends of the resilient element 31 abut against the operating part 21 and the expanding rod 40 respectively, and the resilient element 31 is preferably a compression spring.

The displacement absorber 30 is not limited to driving the expanding rod 40 using resiliency of the resilient element 31. For example, in the second embodiment of the universal security lock, the resilient element 31 is replaced by two magnetic elements that repel each other.

Figure 6:
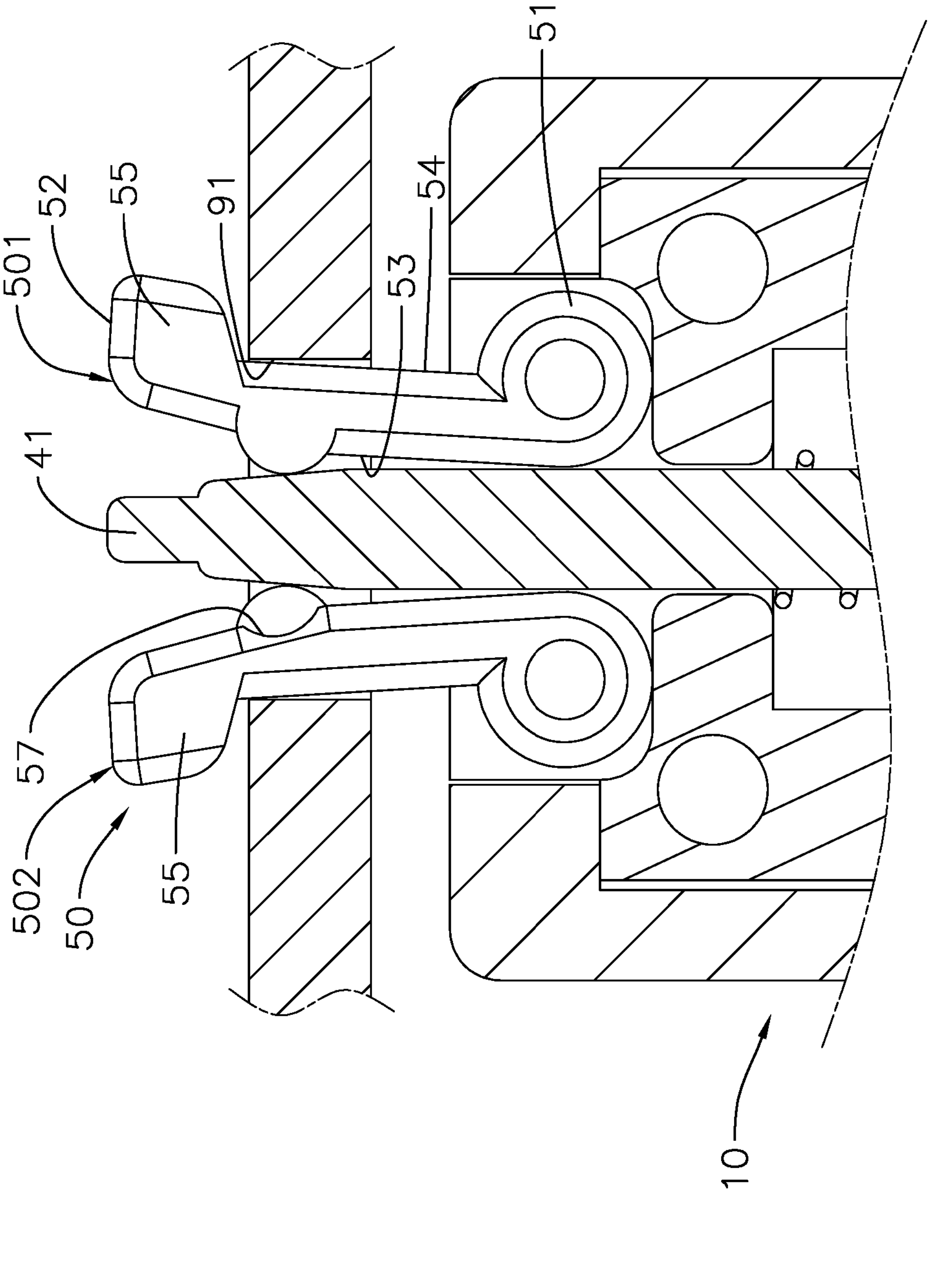
FIG. 6 is an enlarged operational cross sectional view of the universal security lock in FIG. 1, showing that when the operating part is in the engaged position, the two gripping fingers are expanded by the expanding rod and engage in a security slot.

With reference to FIGS. 5 and 6, each of the gripping fingers 50 has an inner end 51, an outer end 52, an inner surface 53, an outer surface 54, and an electronic-device-engaging portion 55.

The inner end 51 is located in the passage 11 and is pivotal relative to the lock case 10. The two inner ends 51 of the two gripping fingers 50 are each disposed on a respective one of two opposite sides of the expanding rod 40. The outer end 52 protrudes from the lock case 10 via the front opening 101.

The inner surface 53 is defined as a surface of the gripping finger 50 that faces toward another gripping finger 50. The outer surface 54 is opposite to the inner surface 53. The electronic-device-engaging portion 55 protrudes from the outer surface 54 and is disposed on the outer end 52.

The gripping fingers 50 are configured to be mounted through the security slot 91 of the portable electronic device, and then the electronic-device-engaging portions 55 abut against an inner surface of the portable electronic device to prevent the gripping fingers 50 from being pulled out from the security slot 91 (as shown in FIG. 6).

For ease of understanding, the two gripping fingers 50 are respectively defined as a first gripping finger 501 and a second gripping finger 502 (as shown in FIG. 6). The inner surface 53 of the first gripping finger 501 has an opening protrusion 56 protruding thereon. The opening protrusion 56 is disposed closer to the outer end 52 of the first gripping finger 501 than the inner end 51 of the first gripping finger 501 is.

The inner surface 53 of the second gripping finger 502 has a closing recess 57 formed therein. When the first gripping finger 501 and the second gripping finger 502 pivot toward each other, the opening protrusion 56 of the first gripping finger 501 is movable into the closing recess 57 of the second gripping finger 502. The closing recess 57 increases a range of an angle at which the two gripping fingers 50 are pivotal toward each other by accommodating the corresponding opening protrusion 56.

In the preferred embodiment, the two gripping fingers 50 are structurally identical, and only differ in position. That is, the inner surface 53 of the second gripping finger 502 also has an opening protrusion 56 formed thereon, and the inner surface 53 of the first gripping finger 501 has a closing recess 57 formed therein. The opening protrusion 56 of the second gripping finger 502 is movable into the closing recess 57 of the first gripping finger 501.

With reference to FIGS. 6 to 9, when the expanding rod 40 is moved toward the front opening 101, the abutting end 41 of the expanding rod 40 abuts against the two inner surfaces 53 of the two gripping fingers 50 and drives the two electronic-device-engaging portions 55 to move away from each other gradually; that is, an angle formed by the two gripping fingers 50 gradually increases as the expanding rod 40 moves toward the front opening 101 such that a distance between the two electronic-device-engaging portions 55 gradually increases.

With reference to FIGS. 3 and 4, the returning resilient element 60 drives the expanding rod 40 to move away from the front opening 101. When the operating part 21 is in the engaged position (as shown in FIG. 4), restoring resilient force of the returning resilient element 60 exerted on the expanding rod 40 is smaller than force of the displacement absorber 30 exerted on the expanding rod 40 such that when the operating part 21 is in the engaged position, the returning resilient element 60 does prevent the displacement absorber 30 from driving the expanding rod 40 to move toward the front opening 101.

When the operating part 21 is moved outwardly out of the passage 11 to the disengaged position (as shown in FIG. 3), the force of the displacement absorber 30 exerted on the expanding rod 40 reduces rapidly such that the restoring resilient force of the returning resilient element 60 exerted on the expanding rod 40 is greater than that of the displacement absorber 30. As a result, the expanding rod 40 is moved away from the front opening 101 such that the angle formed between the two gripping fingers 50 gradually decreases.

In summary, when the operating part 21 is away from the engaged position, the returning resilient element 60 makes the expanding rod 40 move away from the front opening 101 automatically such that the user can pull out the gripping fingers 50 from the security slot 91.

How to use the present invention is elaborated as follows.

With reference to FIGS. 3 to 6, first set the operating part 21 of the lock core 20 in the disengaged position, and then press the operating part 21 to move the operating part 21 to the engaged position (as shown in FIGS. 4 and 6). In the engaged position, the operating part 21 pushes the displacement absorber 30, making the displacement absorber 30 push the expanding rod 40 toward the front opening 101 such that the two electronic-device-engaging portions 55 of the two gripping fingers 50 are driven away from each other. As a result, the present invention is capable of engaging with the security slot 91.

Figure 7:
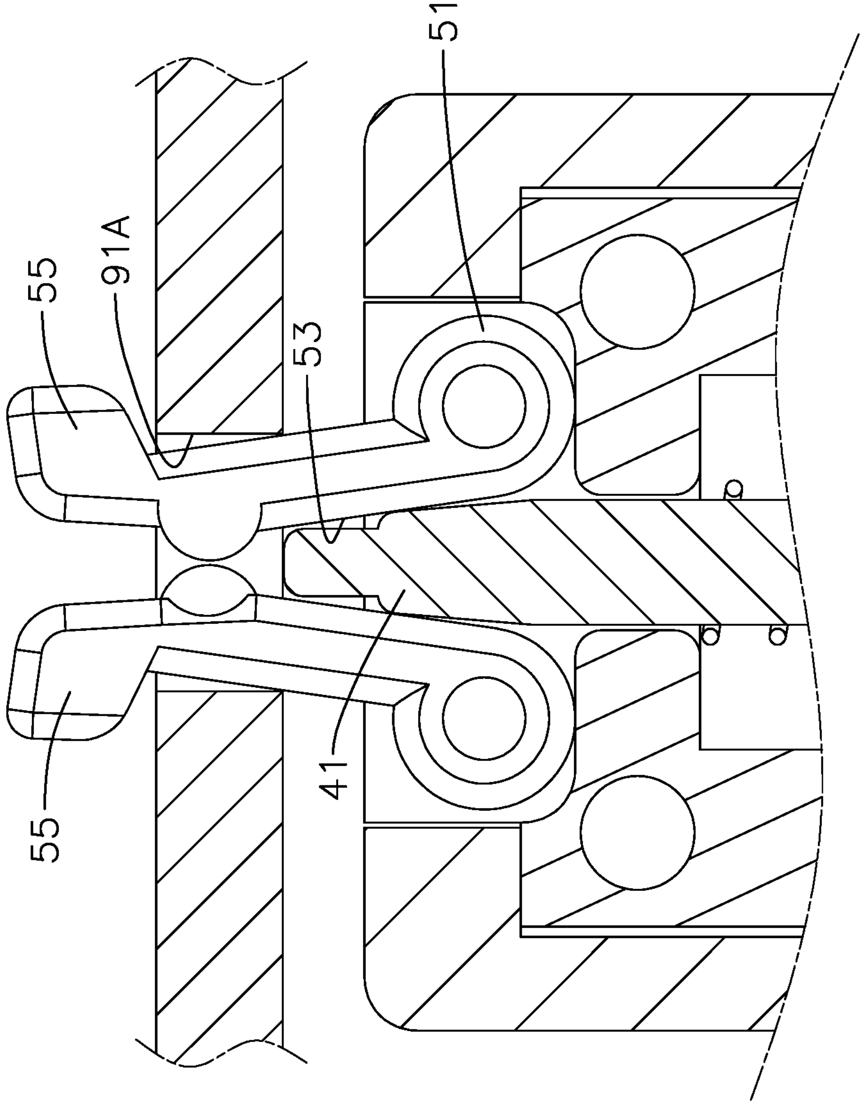
FIGS. 7 to FIG. 9 are operational cross sectional views of the universal security lock in FIG. 1, showing that when the operating part is in the same engaged position, two electronic-device-engaging portions of the two gripping fingers can be moved to different expanded positions to engage in security slots of different widths.
Figure 8:
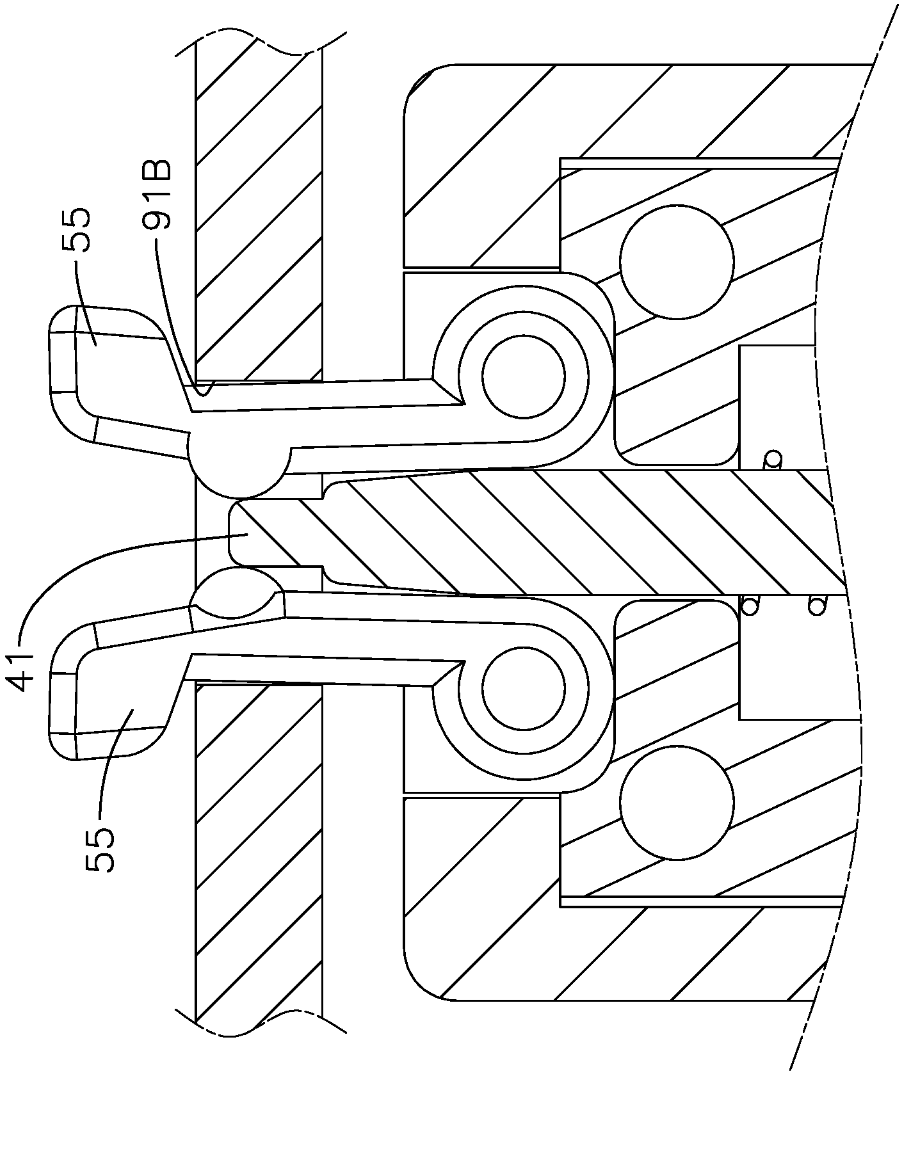
Figure 9:
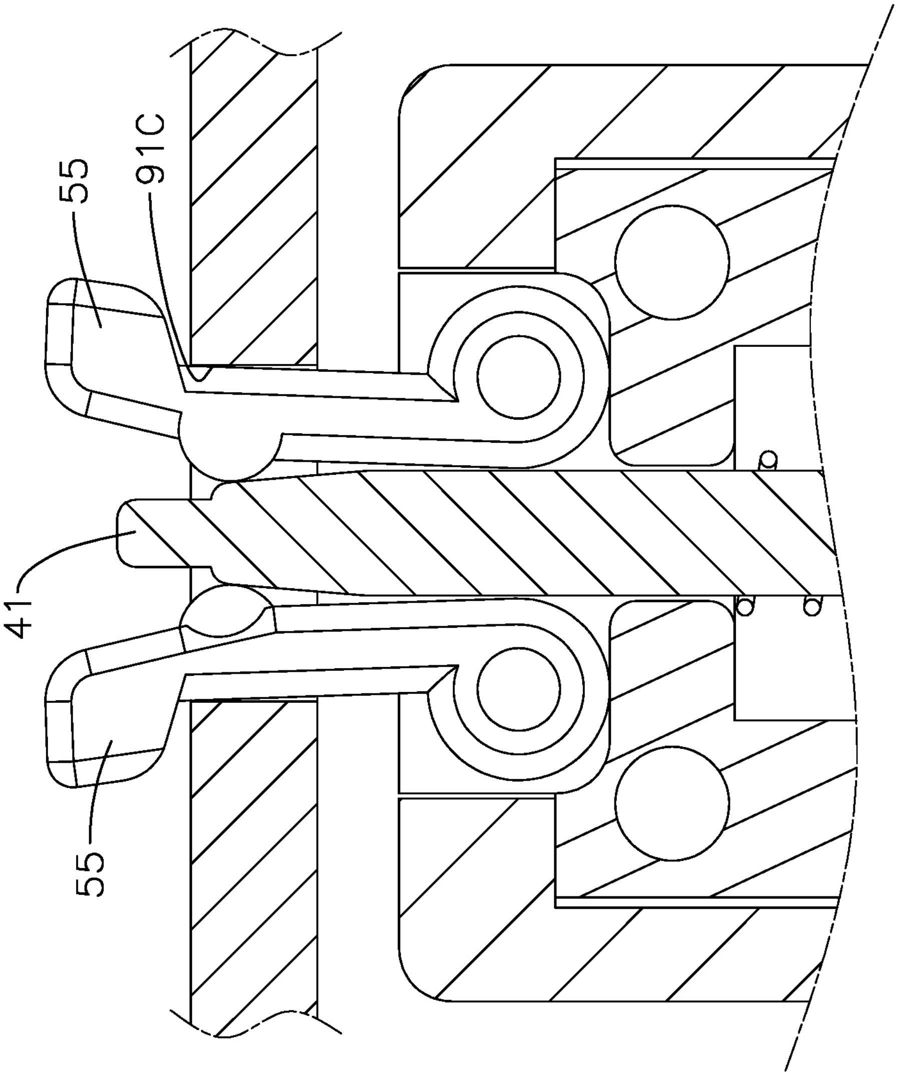

With reference to FIGS. 6 to 9, when the operating part 21 is moved to the engaged position, the displacement absorber 30 forces the two electronic-device-engaging portions 55 to move away from each other via the expanding rod 40 until the gripping fingers 50 are limited by width of the security slot 91. As a result, the present invention enables the distance between the two electronic-device-engaging portions 55 to be adjusted in a stepless manner; that is, the two gripping fingers 50 are capable of engaging with security slots 91, 91A (as shown in FIG. 7), 91B (as shown in FIG. 8), and 91C (as shown in FIG. 9) that differ in width given that the operating part 21 is in the same engaged position.

The abutting end 41 of the expanding rod 40 is capable of abutting against the opening protrusion 56 of the first gripping finger 501 to further increase the distance between two electronic-device-engaging portions 55 such that the gripping fingers 50 are capable of engaging with security slots 91 of greater widths.

To disengage the universal security lock from the security slot 91, simply restore the operating part 21 to the disengaged position.

The advantage of the front section 111 being nonparallel to the rear section 112 is that when the universal security lock is used for securing a laptop (not shown in figures), the front section 111 conforms with the security slot 91 and is laid flat on a desk, while the rear section 112 is bent upward due to the angle between the rear section 112 and the front section 111. As a result, the lock core 20 is more convenient to operate.

Figure 10:
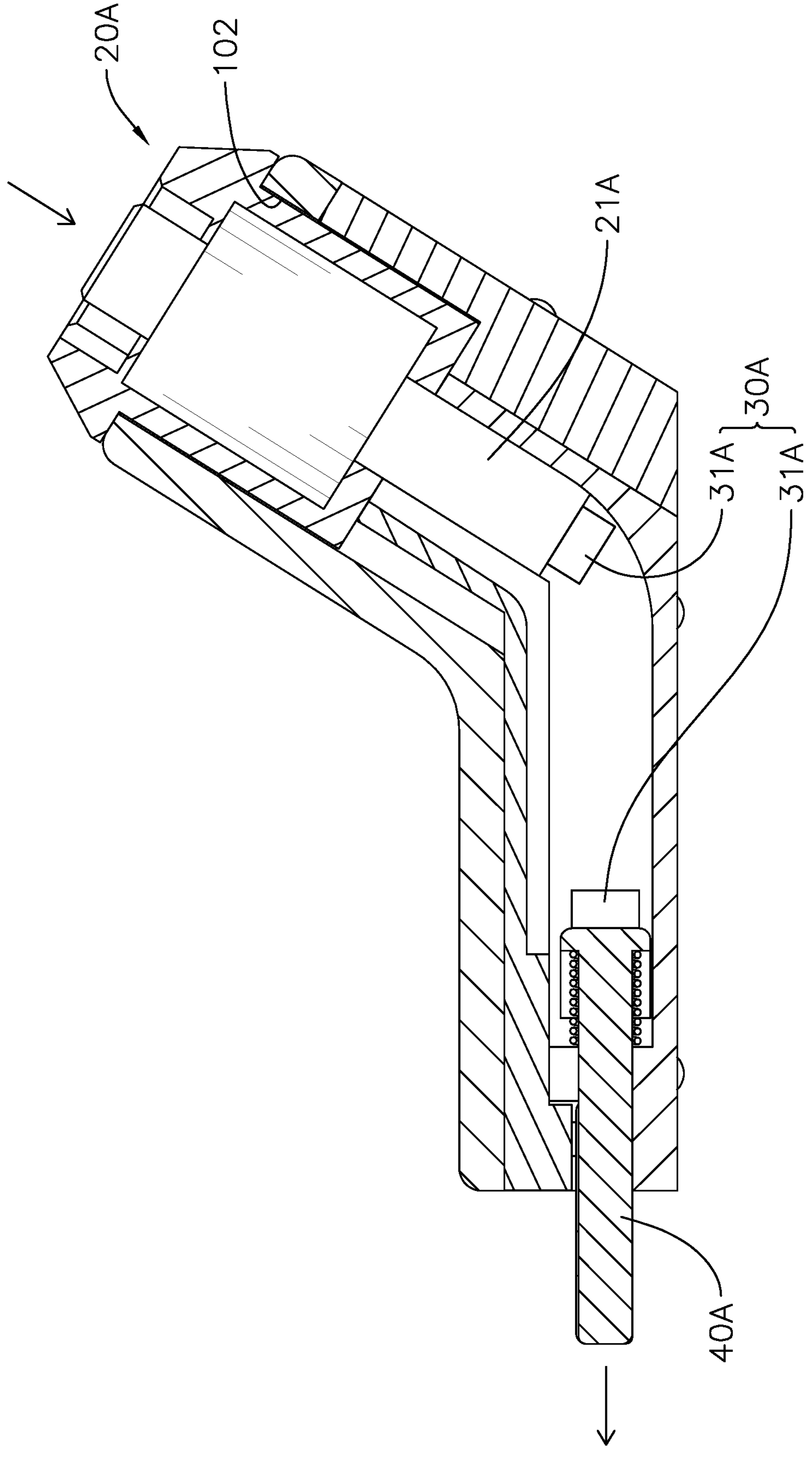
FIG. 10 is a schematic longitudinal sectional view of a second embodiment of a universal security lock for portable electronic devices in accordance with the present invention.

With reference to FIG. 10, a second embodiment of the universal security lock is substantially similar to the first embodiment mentioned above, but the difference is that the displacement absorber 30A includes two magnetic elements 31A, and the two magnetic elements 31A repel each other. One of the magnetic elements 31A is mounted on the operating part 21A of the lock core 20A, and the other magnetic element 31A is mounted on the expanding rod 40A. When the operating part 21A is in the engaged position, repulsion between the two magnetic elements 31A drives the expanding rod 40A to move away from the operating part 21A.

Figure 11:
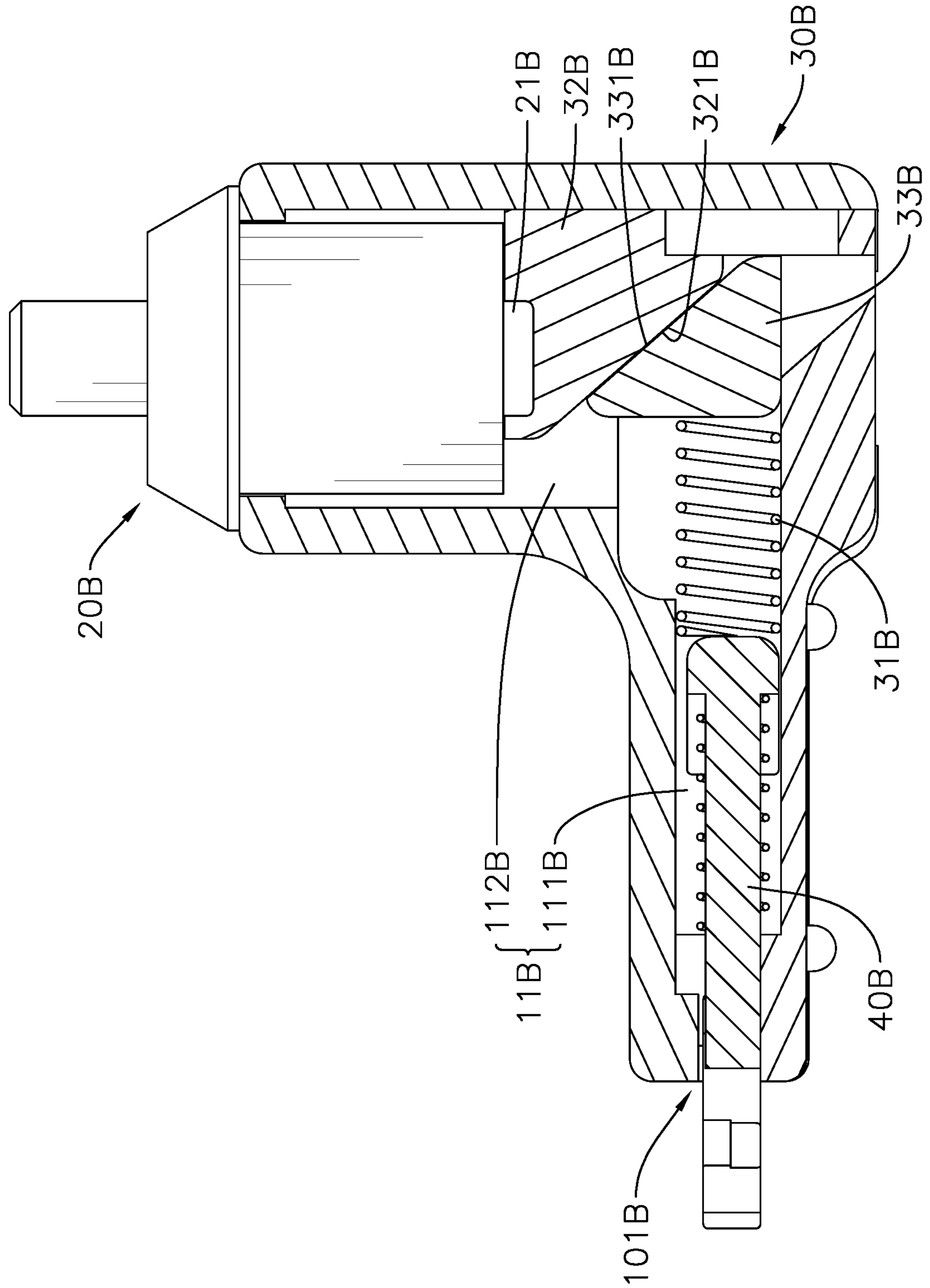
FIGS. 11 and 12 are schematic longitudinal sectional views of a third embodiment of a universal security lock for portable electronic devices in accordance with the present invention, showing an operating part moving from a disengaged position to an engaged position.
Figure 12:
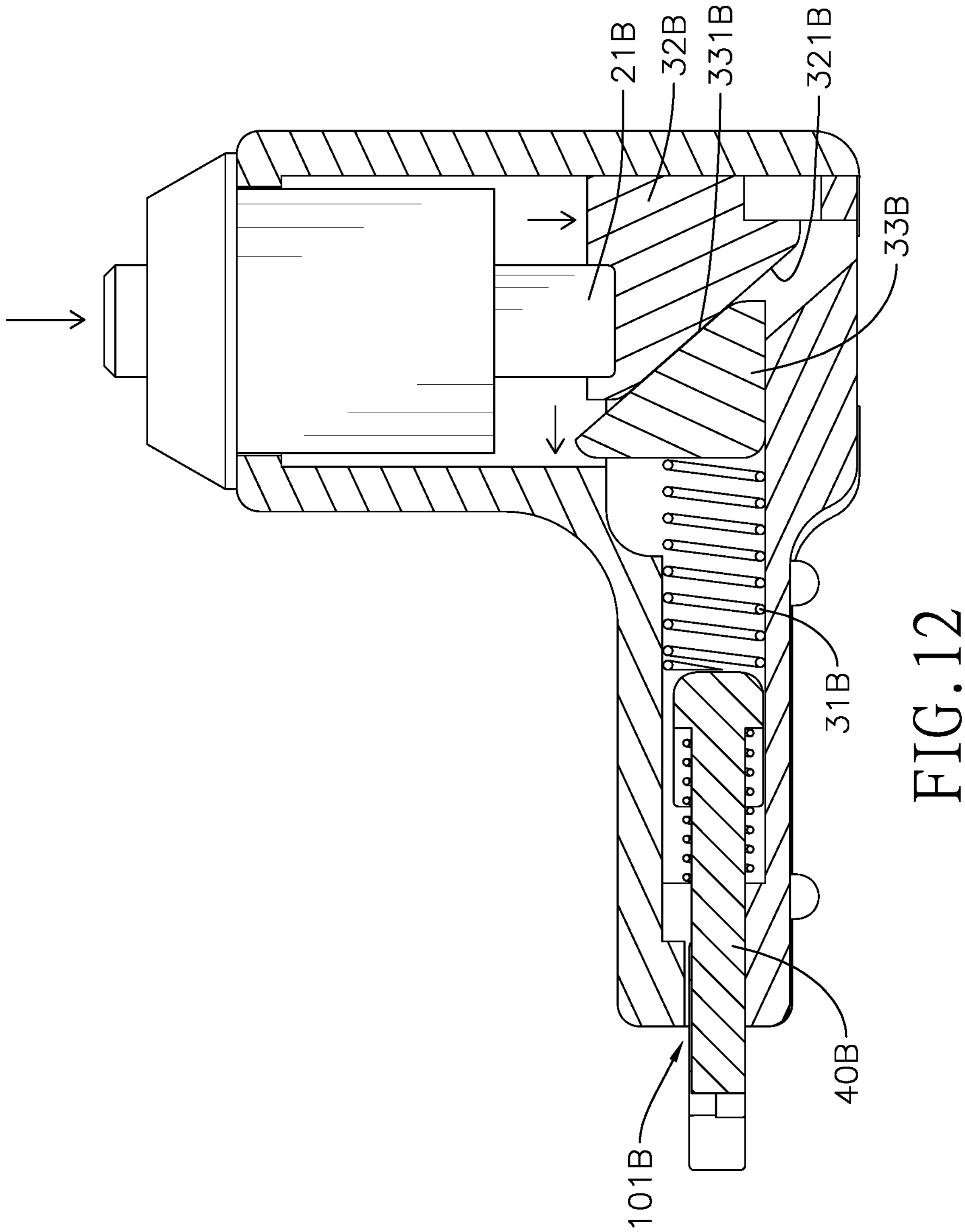

With reference to FIGS. 11 and 12, a third embodiment of the universal security lock is substantially similar to the first embodiment mentioned above, but the difference is that the displacement absorber 30B includes a resilient element 31B, a first angled block 32B, and a second angled block 33B such that when the front section 111B and the rear section 112B form a greater angle, the displacement absorber 30B is still compatible. To be precise, the front section 111B is substantially perpendicular to the rear section 112B.

The first angled block 32B is mounted in the rear section 112B and is movable along the extending direction of the rear section 112B. The first angled block 32B has a first abutting surface 321B which is preferably a flat surface tilted at an angle to the extending direction of the rear section 112B.

The second angled block 33B is mounted in the front section 111B and is movable along the extending direction of the front section 111B. The second angled block 33B has a second abutting surface 331B which is preferably a flat surface tilted at an angle to the extending direction of the front section 111B.

The second abutting surface 331B slidably abuts against the first abutting surface 321B of the first angled block 32B. When the first angled block 32B is moved along the extending direction of the rear section 112B toward the second angled block 33B, the second angled block 33B is driven by the first angled block 32B to move toward the front opening 101B. Therefore, movement of the operating part 21B along the rear section 112B is converted to movement of the second angled block 33B along the front section 111B, allowing the operating part 21B to drive components disposed in the front section 111B even when the front section 111B and the rear section 112B form a greater angle or are even perpendicular to each other.

In the preferred embodiment, the resilient element 31B is disposed between the second angled block 33B and the expanding rod 40B, and drives the second angled block 33B and the expanding rod 40B to move away from each other, but the resilient element 31B is not limited thereto. In another preferred embodiment, the resilient element 31B is disposed between the first angled block 32B and the operating part 21B.

The resilient element 31B can be replaced by the two magnetic elements 31A. The two magnetic elements 31A can be disposed on the second angled block 33B and the expanding rod 40B respectively; or, the two magnetic elements 31A can be disposed on the first angled block 32B and the expanding rod 40B respectively; or the two magnetic elements 31A can be disposed on the first abutting surface 321B of the first angled block 32B and the second abutting surface 331B of the second angled block 33B respectively.

To sum up, the operating part 21 of the lock core 20 drives the expanding rod 40 via the displacement absorber 30, and movement of the expanding rod 40 gradually expands the two electronic-device-engaging portions 50. As a result, when the operating part 21 is moved to the engaged position, the displacement absorber 30 continuously pushes the expanding rod 40 toward the front opening 101 and forces the two electronic-device-engaging portions 55 to expand until the two gripping fingers 50 are stopped by width of the security slot 91. Therefore, the present invention is compatible with security slots 91 of different widths.

In other words, when the operating part 21 is moved to the same engaged position, the two gripping fingers 50 can be expanded to multiple different expanded positions, unlike conventional security lock that can only be expanded to a single expanded position. As a result, the present invention is compatible with security slots 91 of different widths.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A universal security lock for portable electronic devices comprising:

a lock case having a passage formed therein; the passage forming a front opening and a rear opening; the front opening and the rear opening each disposed on a respective one of two opposite ends of the lock case;

a lock core, a displacement absorber, an expanding rod, and two gripping fingers; the lock core, the displacement absorber, the expanding rod, and the two gripping fingers disposed in the passage of the lock case and arranged in a direction from the rear opening to the front opening; wherein the lock core is mounted to the rear opening and has an operating part movably mounted through the rear opening and being movable inwardly into the passage to an engaged position;

the expanding rod is slidably disposed in the passage; an end, which is toward the front opening, of the expanding rod is defined as an abutting end;

the displacement absorber drives the operating part and the expanding rod such that the operating part and the expanding rod tend to move away from each other;

each of the gripping fingers has an inner end located in the passage and being pivotal relative to the lock case; each of the two inner ends of the two gripping fingers disposed on a respective one of two opposite sides of the expanding rod;

an outer end protruding from the lock case;

an inner surface facing toward another one of the gripping fingers;

an outer surface being opposite to the inner surface; and an electronic-device-engaging portion protruding from the outer surface and disposed on the outer end;

wherein when the expanding rod is moved toward the front opening, the abutting end of the expanding rod abuts against the two inner surfaces of the two gripping fingers and drives the two electronic-device-engaging portions to move away from each other gradually; and wherein when the operating part of the lock core is in the engaged position, the operating part pushes the displacement absorber, making the displacement absorber push the expanding rod toward the front opening such that the two electronic-device-engaging portions of the two gripping fingers are driven to move away from each other;

wherein, the passage of the lock case has:

a rear section; an end of the rear section forming the rear opening; the lock core disposed in the rear section; and a front section; an end of the front section forming the front opening; an extending direction of the front section being nonparallel to an extending direction of the rear section; the two gripping fingers and the expanding rod disposed in the front section; and an end of the displacement absorber is disposed in the rear section, and another end of the displacement absorber is disposed in the front section.

2. The universal security lock for the portable electronic devices as claimed in claim 1, wherein the displacement absorber has:

a first angled block mounted in the rear section and being movable along the extending direction of the rear section; the first angled block having a first abutting surface; and a second angled block mounted in the front section and being movable along the extending direction of the front section; the second angled block having a second abutting surface which slidably abuts against the first abutting surface of the first angled block; and wherein when the first angled block is moved along the extending direction of the rear section toward the second angled block, the second angled block is driven by the first angled block to move toward the front opening.

3. The universal security lock for the portable electronic devices as claimed in claim 1, wherein the displacement absorber has a resilient element; when the operating part of the lock core is in the engaged position, resiliency of the resilient element drives the expanding rod to move away from the operating part.

4. The universal security lock for the portable electronic devices as claimed in claim 2, wherein the displacement absorber has a resilient element; when the operating part of the lock core is in the engaged position, resiliency of the resilient element drives the expanding rod to move away from the operating part.

5. The universal security lock for the portable electronic devices as claimed in claim 1, wherein the displacement absorber has two magnetic elements; the two magnetic elements repel each other, and repulsion between the two magnetic elements drives the expanding rod to move away from the operating part.

6. The universal security lock for the portable electronic devices as claimed in claim 2, wherein the displacement absorber has two magnetic elements; the two magnetic elements repel each other, and repulsion between the two magnetic elements drives the expanding rod to move away from the operating part.

7. The universal security lock for the portable electronic devices as claimed in claim 5, wherein one of the magnets is mounted on the operating part of the lock core, and the other magnet is mounted on the expanding rod.

8. The universal security lock for the portable electronic devices as claimed in claim 6, wherein one of the magnets is mounted on the operating part of the lock core, and the other magnet is mounted on the expanding rod.

9. The universal security lock for the portable electronic devices as claimed in claim 1, wherein the two gripping fingers are respectively a first gripping finger and a second gripping finger;

the inner surface of the first gripping finger has an opening protrusion protruding thereon; the opening protrusion is disposed closer to the outer end of the first gripping finger than the inner end of the first gripping finger is; and the abutting end of the expanding rod selectively abuts against the opening protrusion of the first gripping finger.

10. The universal security lock for the portable electronic devices as claimed in claim 2, wherein the two gripping fingers are respectively a first gripping finger and a second gripping finger;

the inner surface of the first gripping finger has an opening protrusion protruding thereon; the opening protrusion is disposed closer to the outer end of the first gripping finger than the inner end of the first gripping finger is; and the abutting end of the expanding rod selectively abuts against the opening protrusion of the first gripping finger.

11. The universal security lock for the portable electronic devices as claimed in claim 9, wherein the second gripping finger has a closing recess formed in the inner surface thereof; and when the first gripping finger and the second gripping finger pivot toward each other, the opening protrusion of the first gripping finger is movable into the closing recess of the second gripping finger.

12. The universal security lock for the portable electronic devices as claimed in claim 10, wherein the second gripping finger has a closing recess formed in the inner surface thereof; and when the first gripping finger and the second gripping finger pivot toward each other, the opening protrusion of the first gripping finger is movable into the closing recess of the second gripping finger.

13. The universal security lock for the portable electronic devices as claimed in claim 1, wherein the universal security lock further has a returning resilient element; the returning resilient element drives the expanding rod to move away from the front opening;

when the operating part is in the engaged position, restoring resilient force of the returning resilient element exerted on the expanding rod is smaller than force of the displacement absorber exerted on the expanding rod; and when the operating part is moved outwardly out of the passage of the lock case to a disengaged position, the returning resilient element moves the expanding rod away from the front opening.

14. The universal security lock for the portable electronic devices as claimed in claim 2, wherein the universal security lock further has a returning resilient element; the returning resilient element drives the expanding rod to move away from the front opening;

when the operating part is in the engaged position, restoring resilient force of the returning resilient element exerted on the expanding rod is smaller than force of the displacement absorber exerted on the expanding rod; and when the operating part is moved outwardly out of the passage of the lock case to a disengaged position, the returning resilient element moves the expanding rod away from the front opening.

15. The universal security lock for the portable electronic devices as claimed in claim 1, wherein a width of the abutting end of the expanding rod gradually increases toward the rear opening.

16. The universal security lock for the portable electronic devices as claimed in claim 2, wherein a width of the abutting end of the expanding rod gradually increases toward the rear opening.

* * * * *